(12) United States Patent
Winik et al.

(10) Patent No.: US 12,731,060 B2
(45) Date of Patent: Sep. 8, 2026

(54) ADIABATIC CZ GATE BETWEEN FIXED-FREQUENCY QUBITS AND A TUNABLE FLUXONIUM COUPLER

(71) Applicant: Massachusetts Institute of Technology, Cambridge, MA (US)

(72) Inventors: Roni Winik, Somerville, MA (US); Junyoung An, Cambridge, MA (US); William D. Oliver, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 9 days.

(21) Appl. No.: 18/665,909

(22) Filed: May 16, 2024

(65) Prior Publication Data

US 2026/0023994 A1 Jan. 22, 2026

Related U.S. Application Data

(60) Provisional application No. 63/503,034, filed on May 18, 2023.

(51) Int. Cl.
*G06N 10/20* (2022.01)
*G06N 10/40* (2022.01)

(52) U.S. Cl.
CPC ............. *G06N 10/20* (2022.01); *G06N 10/40* (2022.01)

(58) Field of Classification Search
CPC ......... G06N 10/20; G06N 10/40; H03K 17/92
(Continued)

(56) References Cited

U.S. PATENT DOCUMENTS 10,852,346 B1 * 12/2020 Zeng ...................... G06N 10/40
11,244,241 B1 2/2022 Gambetta et al.
(Continued)

FOREIGN PATENT DOCUMENTS

DE 10 2020 201 688 2/2020
WO WO 2018/151929 A1 8/2018
(Continued)

OTHER PUBLICATIONS

Chu et al., "Coupler-Assisted Controlled-Phase Gate with Enhanced Adiabaticity;" Journal Article from Phys. Rev. Applied 16, 054020; Published Nov. 2, 2021; 22 Pages.
(Continued)

*Primary Examiner* — Tomi Skibinski
(74) *Attorney, Agent, or Firm* — Daly, Crowley, Mofford & Durkee, LLP

(57) ABSTRACT

A system and method provide a configurable quantum logic gate. The system includes two fixed-frequency transmon qubits that are capacitively coupled to each other and to a tunable fluxonium coupler. Applying a magnetic flux to the coupler results in a controlled decrease in the ZZ interaction between the two transmon qubits. When the two transmon qubits have a small, positive ZZ interaction without any field present, applying a particular flux to the coupler effectively eliminates the interaction. Applying a larger flux produces a large, negative ZZ interaction that results in an avoided level crossing at an operational frequency. Appropriate choice of the applied flux permits implementation of, among other things, an adiabatic controlled Z (CZ) gate having high fidelity and low complexity.

20 Claims, 7 Drawing Sheets

(58) Field of Classification Search
USPC .......................................................... 327/528
See application file for complete search history.

(56) References Cited

U.S. PATENT DOCUMENTS

| | | | |
|---|---|---|---|
| 11,615,336 | B2 | 3/2023 | Oliver et al. |
| 2018/0032894 | A1 | 2/2018 | Epstein |
| 2020/0287540 | A1 | 9/2020 | Smith et al. |
| 2020/0394101 | A1 | 12/2020 | Kerman |
| 2022/0108200 | A1 | 4/2022 | Suttle et al. |
| 2022/0255540 | A1 | 8/2022 | Mckay et al. |
| 2022/0383169 | A1 | 12/2022 | Kandala et al. |
| 2023/0401475 | A1 | 12/2023 | Finck et al. |
| 2023/0401476 | A1 | 12/2023 | Finck et al. |

FOREIGN PATENT DOCUMENTS

| | | |
|---|---|---|
| WO | WO 2021/178042 A1 | 9/2021 |
| WO | WO 2022/060897 A1 | 3/2022 |

OTHER PUBLICATIONS

Kjaergaard et al., "Superconducting Qubits: Current State of Play;" Annual Review of Condensed Matter Physics; First Published as a Review in Advance on Dec. 17, 2019; 29 Pages.
Koch et al., "Charge Insensitive Qubit Design Derived from the Cooper Pair Box;" Article from Phys. Rev. Applied 76, 042319; Last Revised on Sep. 26, 2007; 21 Pages.
Petrescu et al., "Accurate Methods for the Analysis of Strong-Drive Effects in Parametric Gates;" Journal Article in Phys. Rev. Applied 19, 044003; Published Apr. 3, 2023; 23 Pages.
Stehlik et al., "Tunable Coupling Architecture for Fixed-Frequency Transmon Superconducting Qubits;" Journal Article from Physical Review Letters 127, 080505; Jan. 2021; 6 Pages.
Response to U.S. Non-Final Office Action dated Oct. 9, 2024 for U.S. Appl. No. 18/048,574; Response Filed Jan. 9, 2025; 6 Pages.
Bao et al., "Fluxonium: An Alternative Qubit Platform for High-Fidelity Operations;" Physical Review Letters vol. 129, 010502; Published Jun. 28, 2022; 19 Pages.
Dogan et al., "Demonstration of the Two-Fluxonium Cross-Resonance Gate;" Retrieved from: https://arxiv.org/abs/2204.11829; Apr. 25, 2022; 17 Pages.
Liu et al., "Multi-Target-Qubit Unconventional Geometric Phase Gate in a Multi-Cavity System;" Scientific Reports, vol. 6, 21562; Published Feb. 22, 2016; 13 Pages.
Moskalenko et al., "High Fidelity Two-Qubit Gates on Fluxoniums Using a Tunable Coupler;" Article from *Nature*, npj Quantum Information; Published Nov. 8, 2022; 10 Pages.
Nesterov et al., "Microwave-Activated Controlled-Z Gate for Fixed-Frequency Fluxonium Qubits;" Article from Physical Review A, vol. 98, 030301; Published Sep. 24, 2018; 7 Pages.
PCT International Search Report and Written Opinion dated Mar. 28, 2025 for International Application No. PCT/US2023/085011; 11 Pages.
Rule 312 Amendment filed on Apr. 18, 2025 for U.S. Appl. No. 18/048,574; 23 Pages.
Martovetsky et al., "ITER CS Quench Detection System and Its Qualification by Numerical Modeling"; IEEE Transactions on Applied Superconductivity, vol. 24, No. 3; Jun. 2014; 4 pages.
Huang et al., "Localized Hotspot Detection for Quench Prevention in HTS Magnets Using Distributed Fiber Bragg Gratings"; Journal of Lightwave Technology, vol. 41, No. 22; Nov. 2023; 9 pages.
Coatanea-Gouachet et al., "Electromagnetic Quench Detection in ITER Superconducting Magnet Systems"; IEEE Transactions on Applied Superconductivity, vol. 25, No. 3; Jun. 2015; 7 pages.
De, "Coupled-Qubit Tavis-Cummings Scheme for Prolonging Quantum Coherence;" Article from Physical Review A; vol. 91; Published Jan. 13, 2015; 9 Pages.
Kounalakis et al., "Tuneable Hopping and Nonlinear Cross-Kerr Interactions in a High-Coherence Superconducting Circuit;" Article from npj Quantum Information, vol. 4, Article No. 38; Aug. 8, 2018; 19 Pages.
U.S. Non-Final Office Action dated Oct. 9, 2024 for U.S. Appl. No. 18/048,574; 9 Pages.
U.S. Appl. No. 18/048,574, filed Oct. 21, 2022, Di Paolo et al.
Arute et al.; "Quantum supremacy using a programmable superconducting processor"; Nature; vol. 574; Oct. 24, 2019; 7 Pages.
Barends et al.; "Diabatic gates for frequency-tunable superconducting qubits"; Physical Review Letters; vol. 123, No. 21; Nov. 19, 2019; 8 Pages.
Berke et al.; "Transmon platform for quantum computing challenged by chaotic fluctuations"; Nature Communications; May 6, 2022; 10 Pages.
Breuer et al.; "Adiabatic processes in the ionization of highly excited hydrogen atoms"; Zeitschrift fur Physik D Atoms, Molecules and Clusters; vol. 11; Mar. 11, 1989; 14 Pages.
Breuer et al., "Strong Laser Fields Interacting with Matter;" Universitat Bonn Physikalisches Institut; Jan. 6, 1988; 20 Pages.
Breuer et al., "The Role of Avoided Crossings in the Dynamics of Strong Laser Field—Matter Interactions;" Proceedings of Z Phys. D—Atoms, Molecules and Clusters, vol. 8; 9 Pages.
Breuer et al.; "Transport of quantum states of periodically driven systems"; Journal de Physique (France); vol. 51; Apr. 15, 1990; 15 Pages.
Brink et al.; "Device challenges for near term super-conducting quantum processors: frequency collisions"; 2018 IEEE International Electron Devices Meeting (IEDM); Dec. 1, 2018; 3 Pages.
Caldwell et al.; "Parametrically activated entangling gates using transmon qubits"; arXiv:1706.06562v2; Dec. 8, 2017; 7 Pages.
Chen et al.; "Qubit architecture with high coherence and fast tunable coupling"; arXiv:1402.7367v1; Feb. 28, 2014; 10 Pages.
Chow et al.; "Complete universal quantum gate set approaching fault-tolerant thresholds with superconducting qubits"; arXiv:1202.5344v1; Feb. 23, 2012; 13 Pages.
Chow et al.; "Microwave-activated conditional-phase gate for superconducting qubits"; New Journal of Physics; vol. 15, Nov. 19, 2013; 11 Pages.
DiCarlo et al.; "Demonstration of two-qubit algorithms with a superconducting quantum processor"; arXiv:0903.2030v2; May 4, 2009; 9 Pages.
Didier et al.; "Ac flux sweet spots in parametrically modulated superconducting qubits"; Physical Review Applied; vol. 12; Nov. 7, 2019; 11 Pages.
Di Paolo et al.; "Efficient modeling of superconducting quantum circuits with tensor networks"; npj Quantum Information; vol. 7, No. 11; 2021; 11 Pages.
Drese et al., "Floquet Theory for Short Laser Pulses;" Article from the European Physical Journal D, vol. 5; pp. 119-134; Accepted Aug. 25, 1998; 16 Pages.
Ficheux et al.; "Fast logic with slow qubits: microwave-activated controlled-z gate on low-frequency fluxoniums"; American Physical Society; Physical Review X; vol. 11; May 3, 2021; 16 Pages.
Garcia-Ripoll et al.; "Quantum control of frequency-tunable transmon superconducting qubits"; arXiv:2022.10320v3; Jul. 20, 2020; 11 Pages.
Grifoni et al.; "Driven quantum tunneling"; Elsevier Science B.V.; Physics Reports; vol. 304; 1998; 126 Pages.
Guerin, "Complete Dissociation by Chirped Laser Pulses Designed by Adiabatic Floquet Analysis;" Article from Physical Review A, vol. 56, No. 2; Aug. 1997; 5 Pages.
Gyneis et al.; "Moving beyond the transmon: Noise-protected superconducting quantum circuits"; American Physical Society; PRX Quantum; vol. 2; 2021; 15 Pages.
Hertzberg et al.; "Laser-annealing Josephson junctions for yielding scaled-up superconducting quantum processors"; Quantum Information; vol. 7, No. 1; Aug. 19, 2021; 8 Pages.
Holthaus et al., "Generalized π Pulses;" Article from Physical Review A, vol. 49, No. 3; Mar. 1994; 12 Pages.
Hone et al.; "Time-dependent floquet theory and absence of an adiabatic limit"; arXiv:cond-mat/9706182v1; Jun. 17, 1997; 15 Pages.

(56) References Cited

OTHER PUBLICATIONS

Huang et al.; "Engineering dynamical sweet spots to protect qubits from 1/f noise"; Physical Review Applied 15, 034065; 2021; 19 Pages.
Hutchings et al.; "Tunable superconducting qubits with flux-independent coherence"; arXiv:1702.02253v2; Feb. 12, 2017; 17 Pages.
Johansson et al.; "Qutip: An open-source python framework for the dynamics of open quantum systems"; Computer Physics Communications 183 1760-1772; 2012; 13 Pages.
Kandala et al.; "Demonstration of a high-fidelity CNOT gate for fixed-frequency transmons with engineered ZZ suppression"; arXiv:2011.07050v1; Nov. 13, 2020; 10 Pages.
Krinner et al.; "Benchmarking coherent errors in controlled-phase gates due to spectator qubits"; arXiv:2005.05914v1; May 12, 2020; 9 Pages.
Krinner et al.; "Demonstration of an all-microwave controlled-phase gate between far-detuned qubits"; arXiv:2006.10639v1; Jun. 18, 2020; 10 Pages.
Ku, et al.; "Suppression of unwanted ZZ interactions in a hybrid two-qubit system"; arXiv:2003.02775v2; Apr. 9, 2020; 21 Pages.
Leroux, et al.; "Technical notes for the zero ZZ CR gate"; Feb. 8, 2021; 31 Pages.
Magesen et al.; "Effective Hamiltonian models of the cross-resonance gate"; arXiv:1804.04073v2; Feb. 25, 2019; 16 pages.
Malekakhlagh et al.; "First-principles analysis of cross-resonance gate operation"; arXiv:2005.00133v2; May 5, 2020; 30 Pages.
Martinez-Garaot et al.; "Fast quasiadiabatic dynamics"; American Physical Society; Physical Review A; vol. 92; 2015; 6 Pages.
McKay et al.; "A universal gate for fixed-frequency qubits via a tunable bus"; arXiv:1604.03076v3; Dec. 19, 2016; 10 Pages.
McKay et al.; "Efficient Z-gates for Quantum Computing"; Physical Review A; vol. 96, No. 2; Aug. 31, 2017; 8 Pages.
Mitchell et al.; "Hardware-Efficient Microwave-Activated Tunable Coupling between Superconducting Qubits"; arXiv:2105.05384v1; May 12, 2021; 12 pages.
Morvan et al.; "Optimizing frequency allocation for fixed-frequency superconducting quantum processors"; American Physical Society; Physical Review Research; vol. 4; Apr. 28, 2022; 6 Pages.
Motzoi et al.; "Simple pulses for elimination of leakage in weakly nonlinear qubits"; arXiv:0901.0534v3; Oct. 11, 2009; 4 Pages.
Mundada et al.; "Floquet-engineered enhancement of coherence times in a driven fluxonium qubit"; arXiv:2007.13756v1; Jul. 27, 2020; 12 Pages.
Murch et al.; "Quantum fluctuations in the chirped pendulum"; Nature Physics; vol. 7; Feb. 2011; 4 Pages.
Neely et al.; "Generation of three-qubit entangled states using superconducting phase qubits"; arXiv:1004.4246v2; Apr. 29, 2010; 9 Pages.
Paik et al.; "Experimental demonstration of a resonator-induced phase gate in a multiqubit circuit-qed system"; Physical Review letters; vol. 117, No. 25; Dec. 13, 2016; 13 Pages.
Pechal et al.; "Direct implementation of a perceptron in superconducting circuit quantum hardware"; American Physical Society; Physical Review Research; vol. 4; Sep. 8, 2022; 10 Pages.
Peskin et al.; "The solution of the time-dependent schrodinger equation by the (t, t') method: Theory, computational algorithm and applications"; The Journal of Chemical Physics; vol. 99, No. 6; Sep. 15, 1993; 7 Pages.
Pop et al.; "Coherent suppression of electromagnetic dissipation due to superconducting quasiparticles"; Nature; vol. 508; Apr. 17, 2014; 18 Pages.
Rol et al.; "Time-domain characterization and correction of on-chip distortion of control pulses in a quantum processor"; Applied Physics Letters; vol. 116, No. 5; Dec. 20, 2019; 9 Pages.
Salis et al.; "Time-resolved tomography of a driven adiabatic quantum simulation"; Physical Review A; vol. 102, No. 6; 2020; 5 Pages.
Takita, et al.; "Demonstration of weight-four parity measurements in the surface code architecture"; arXiv:1605.0135v3; Apr. 28, 2017; 8 Pages.
Wei et al.; "Quantum crosstalk cancellation for fast entangling gates and improved multi-qubit performance"; arXiv:2106.00675v1; Jun. 1, 2022; 16 Pages.
Weinberg et al.; "Adiabatic perturbation theory and geometry of periodically-driven systems"; Elsevier, Science Direct; Physics Reports; vol. 00; 2017; 41 Pages.
Wood et al.; "Quantification and characterization of leakage errors"; Physical Review A 97, 032306; Mar. 8, 2018; 20 Pages.
Yan et al.; "Engineering Framework for Optimizing Superconducting Qubit Designs"; arXiv:2006.04130v1; Jun. 7, 2020; 6 Pages.
Yatsenko et al.; "Pulse-driven near-resonant quantum adiabatic dynamics: Lifting of quasidegeneracy"; arXiv:quant-ph/0312080v1; Dec. 9, 2003; 21 pages.
Young et al.; "Adiabatic Response to an Oscillatory Field;" Article from Journal of Mathematical Physics, vol. 11, No. 11; Nov. 1970; 9 Pages.
Zhang et al.; "Drive-induced nonlinearities of cavity modes coupled to a transmon ancilla"; arXiv:2016.09112v3; Mar. 8, 2022; 32 Pages.
Zhang et al.; "Preparing quasienergy states on demand: A parametric oscillator"; Physical Review A; vol. 95, No. 5; May 16, 2017; 12 Pages.
U.S. Non-Final Office Action dated Jul. 18, 2022 for U.S. Appl. No. 17/188,461; 13 Pages.
Response to U.S. Non-Final Office Action dated Jul. 18, 2022 for U.S. Appl. No. 17/188,461, filed Oct. 18, 2022; 7 Pages.
U.S. Final Office Action dated Nov. 17, 2022 for U.S. Appl. No. 17/188,461; 7 Pages.
Response to U.S. Final Office Action dated Nov. 17, 2022 for U.S. Appl. No. 17/188,461, filed Dec. 19, 2022; 6 Pages.
U.S. Notice of Allowance dated Jan. 6, 2023 for U.S. Appl. No. 17/188,461; 7 Pages.
U.S. 312 Amendment filed on Feb. 2, 2023 for U.S. Appl. No. 17/188,461; 3 Pages.
U.S. Preliminary Amendment filed on Feb. 2, 2023 for U.S. Appl. No. 18/048,574; 3 Pages.
U.S. Notice of Allowance dated Feb. 13, 2025 for U.S. Appl. No. 18/048,574; 8 Pages.
U.S. Appl. No. 19/161,002, filed Aug. 29, 2025, Ding et al.

* cited by examiner

ADIABATIC CZ GATE BETWEEN FIXED-FREQUENCY QUBITS AND A TUNABLE FLUXONIUM COUPLER

CROSS-REFERENCE TO RELATED APPLICATION

This application claims the benefit of U.S. Provisional Application No. 63/503,034 filed May 18, 2023. The entire contents of that application are incorporated by reference herein.

STATEMENT REGARDING FEDERALLY SPONSORED RESEARCH

This invention was made with government support under FA8702-15-D-0001 awarded by the U.S. Air Force and W911NF-18-1-0411 awarded by the U.S. Army Research Office. The government has certain rights in the invention.

BACKGROUND

Achieving high fidelity two qubit gates in an extensible multi-qubit processor is a one of the major obstacles for fault-tolerant quantum computers. Two-qubit gate errors are mainly governed by the ratio between the speed of the gate, the lifetime of the qubits, and leakage to noncomputational states (i.e., decoherence).

Fixed-frequency transmon qubits provide long lifetimes and coherence times due to their insensitivity to charge and flux noise. In addition, their simplicity enables them to be extensible and easily controllable for large multi-qubit systems. In many cases, the main challenge of using entirely fixed-frequency transmons in a quantum processor is a slow two-qubit gate performance, which reduces its fidelity and creates frequency crowding problems. Approaches have been proposed to enable fast two qubit gates in Stehlik, J. et al., "Tunable Coupling Architecture for Fixed-Frequency Transmon Superconducting Qubits", Phys. Rev. Lett. 127, 080505 (2021) and Petrescu, A. et al., "Accurate methods for the analysis of strong-drive effects in parametric gates", arXiv: 2107.02343 (2021). However, these approaches suffer from error degrading effects as well as inability to completely turn OFF interaction between the qubits. This both reduces the fidelity of the gate, and increases its complexity, which may require complicated compensation pulses such as those described in Chu, J. et al. "Coupler-assisted controlled-phase gate with enhanced adiabaticity", Phys. Rev. Applied 16, 054020 (2021).

SUMMARY OF DISCLOSED EMBODIMENTS

Disclosed embodiments provide a way for inducing ZZ interaction with large ON/OFF ratio between two fixed-frequency transmons by using a tunable fluxonium coupler (a "TFT" system), rather than a transmon coupler between two transmons (a "TTT" system) as known in the art. The energy spectrum of the fluxonium coupler with respect to applied magnetic flux is tunable in disclosed TFT systems. The TFT system allows for flexibility in the choice of anharmonicity of the coupler, as opposed to the TTT system wherein the anharmonicity of the coupler is constant. This flexibility enables design of a two qubit adiabatic CZ gate with a large ratio between the gate's ON state and its OFF operation point where crosstalk and leakage can be minimized. This, in turn, allows implementation of an adiabatic controlled Z ("CZ") gate with two fixed-frequency qubits through the application of a single magnetic flux pulse, avoiding the need for additional compensation pulses. This approach enables not only fast gate performance, but also extensibility to large, multi-qubit systems.

Thus, a first embodiment is a system comprising a first, fixed-frequency transmon qubit; and a second, fixed-frequency transmon qubit that is capacitively coupled to the first qubit; and a fluxonium coupler that is capacitively coupled to the first qubit and to the second qubit; and a magnetic source for applying a magnetic flux to the fluxonium coupler.

In some implementations, the first transmon qubit and the second transmon qubit each comprise a capacitor and a Josephson junction.

In some implementations, the fluxonium coupler comprises a capacitor, a Josephson junction, and an inductor.

In some implementations, the first transmon qubit and the second transmon qubit have a ZZ interaction that is positive when the magnetic source has zero flux.

In some implementations, the magnetic source is configured to apply a biasing magnetic flux that eliminates the ZZ interaction between the first transmon qubit and the second transmon qubit.

In some implementations, the magnetic source is further configured to apply an operating magnetic flux that is greater than the biasing magnetic flux and that produces a given negative ZZ interaction between the first transmon qubit and the second transmon qubit.

In some implementations, the given negative ZZ interaction has a magnitude of at least 10 MHz.

In some implementations, the magnetic source is further configured to sweep the magnetic flux between the biasing magnetic flux and the operating magnetic flux to thereby implement an adiabatic controlled Z (CZ) quantum logic gate.

In some implementations, the magnetic source is further configured to apply a second operating magnetic flux to the fluxonium coupler to thereby implement an adiabatic imaginary swap (iSWAP) quantum logic gate.

In some implementations, the operating magnetic flux and the second operating magnetic flux correspond to fluxonium coupler operating frequencies that are separated by at least 100 MHz.

Another embodiment is a method of performing a quantum logic gate. The method includes providing (a) a first, fixed-frequency transmon qubit, (b) a second, fixed-frequency transmon qubit that is capacitively coupled to the first qubit, and (c) a fluxonium coupler that is capacitively coupled to the first qubit and to the second qubit; and applying a magnetic flux to the fluxonium coupler, thereby altering a ZZ interaction between the first transmon qubit and the second transmon qubit to perform the quantum logic gate.

In some implementations, the quantum logic gate comprises an adiabatic controlled Z (CZ) gate.

In some implementations, providing comprises providing the first and second transmon qubits having a ZZ interaction that is positive before applying the magnetic flux to the fluxonium coupler.

In some implementations, applying the magnetic flux to the fluxonium coupler comprises decreasing the ZZ interaction between the first transmon qubit and the second transmon qubit.

In some implementations, applying the magnetic flux to the fluxonium coupler comprises applying a biasing magnetic flux that eliminates the ZZ interaction between the first transmon qubit and the second transmon qubit.

Some implementations further include applying an operating magnetic flux that is greater than the biasing magnetic flux and that produces a given negative ZZ interaction between the first transmon qubit and the second transmon qubit.

In some implementations, the given negative ZZ interaction has a magnitude of at least 10 MHz.

In some implementations, applying the magnetic flux to the fluxonium coupler comprises sweeping the magnetic flux between the biasing magnetic flux and the operating magnetic flux to thereby implement the quantum logic gate.

Some implementations further include applying a second operating magnetic flux to the fluxonium coupler to thereby implement an adiabatic imaginary swap (iSWAP) quantum logic gate.

In some implementations, the operating magnetic flux and the second operating magnetic flux correspond to fluxonium coupler operating frequencies that are separated by at least 100 MHz.

It is appreciated that the concepts, techniques, and structures disclosed herein may be embodied in other ways, and that the above summary of disclosed embodiments is thus meant to be illustrative rather than comprehensive or limiting. In particular, individual elements of different embodiments described herein may be combined to form other embodiments not specifically set forth above. Various elements, which are described in the context of a single embodiment, also may be provided in other embodiments separately, or in any suitable sub-combination. Moreover, other embodiments not specifically described herein also may be within the scope of the claims set forth below.

DESCRIPTION OF THE SEVERAL VIEWS OF THE DRAWINGS

The manner and process of making and using the disclosed embodiments may be appreciated by reference to the drawings, in which.

DETAILED DESCRIPTION OF EMBODIMENTS

Figure 1:
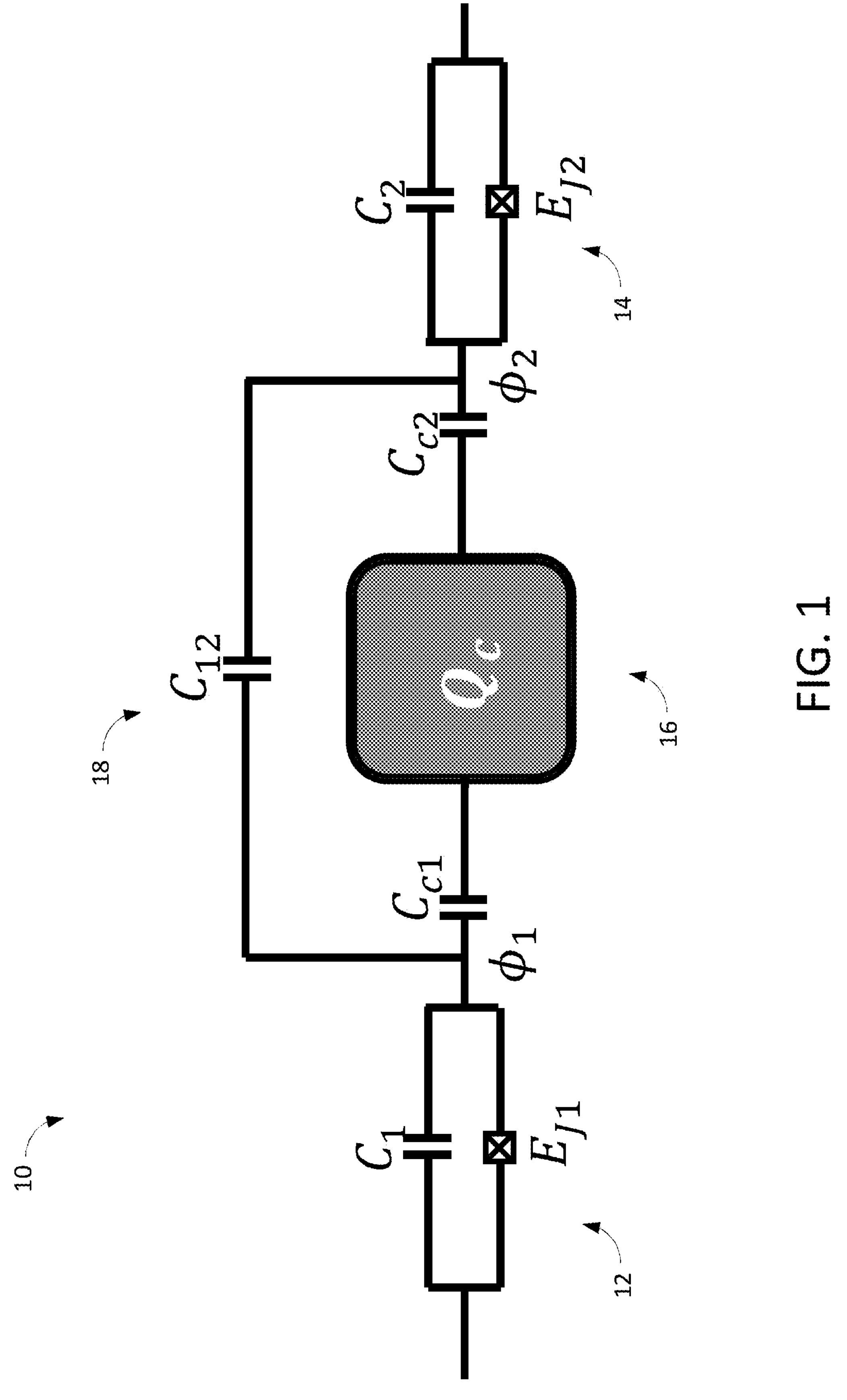
FIG. 1 shows a two-qubit (transmon-transmon) system using a fluxonium coupler according to an embodiment of the concepts, techniques, and structures disclosed herein.

In FIG. 1 is shown two-qubit (transmon-transmon) system 10 using a fluxonium coupler according to an embodiment of the concepts, techniques, and structures disclosed herein. This system 10 may implement a quantum logic gate such as an adiabatic controlled Z ("CZ") gate. The system 10 includes a first transmon qubit 12 coupled to a second transmon qubit 14 using a fluxonium coupler 16 in parallel with a direct capacitive coupling 18.

The first qubit 12 is a transmon qubit, comprising a capacitor having a capacitance $C_1$ and a Josephson junction having a junction energy $E_{J_1}$. During operation, the first qubit 12 is state is determined by magnetic flux $\phi_1$ as indicated.

The second qubit 14 is also a transmon qubit, comprising a capacitor having a capacitance $C_2$ and a Josephson junction having a junction energy $E_{J_2}$. During operation, the second qubit 14 state is determined by magnetic flux $\phi_2$ as indicated. The first qubit 12 is coupled to the second qubit 14 via a direct coupling capacitance $C_{12}$.

Figure 4:
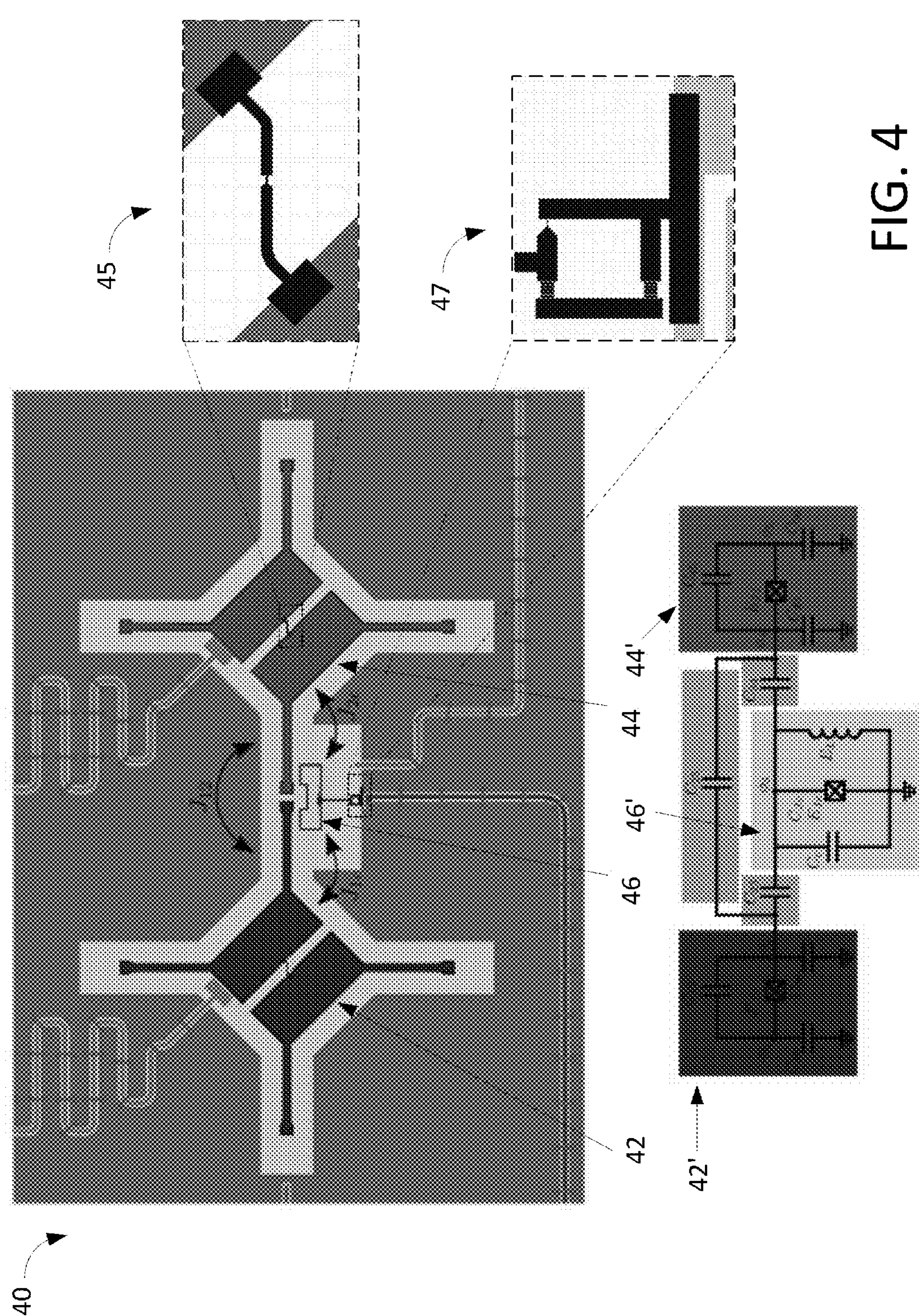
FIG. 4 shows a mask design and equivalent circuit that implements the system of FIG. 1, with enlarged views of certain portions.

In accordance with embodiments of the concepts, techniques, and structures disclosed herein, the first qubit 12 and the second qubit 14 are each capacitively coupled to a fluxonium coupler 16. The equivalent circuit for the fluxonium coupler 16 is shown in FIG. 4, and described below. The first qubit 12 is coupled to the fluxonium coupler 16 via a coupling capacitance $C_{c1}$ and the second qubit 14 is coupled to the fluxonium coupler 16 via a coupling capacitance $C_{c2}$ as indicated.

Disclosed embodiments provide a way for inducing large ZZ interaction between two fixed-frequency transmon qubits 12, 14 using a tunable fluxonium coupler 16 to turn ON and OFF the interactions between the qubits. For that purpose, the energy levels of the fluxonium coupler are engineered as shown in FIG. 3.

Figure 2:
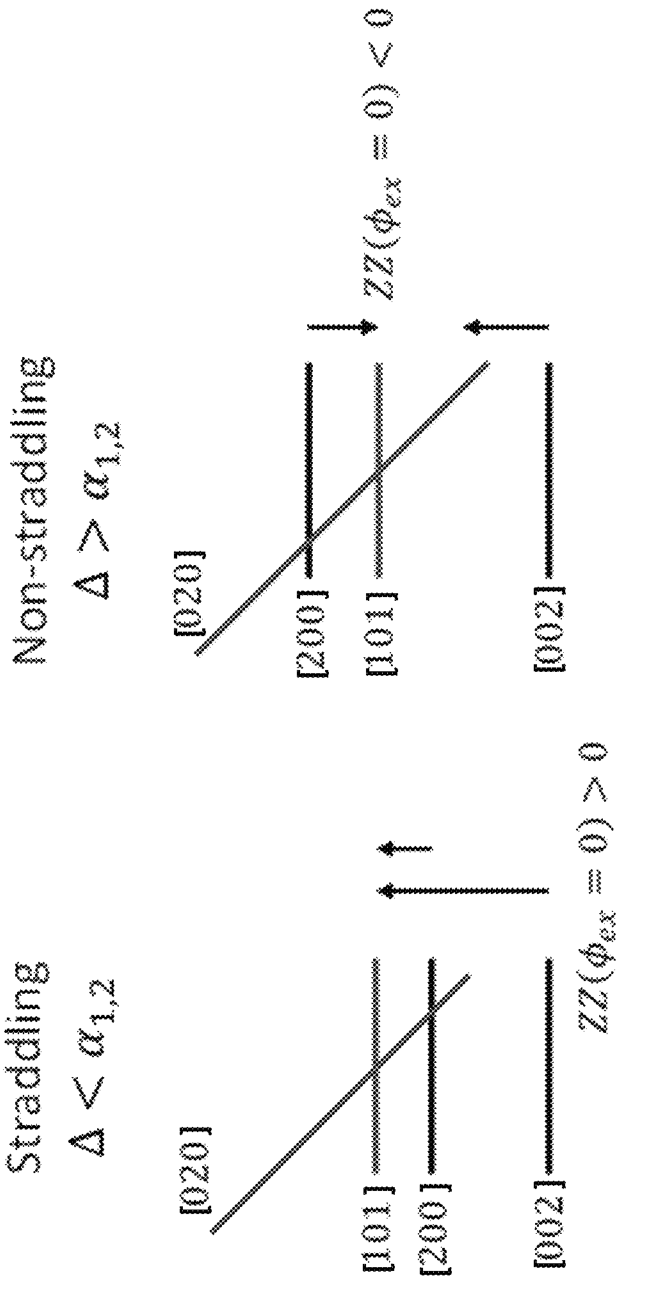
FIG. 2 shows an energy level diagram of the two qubit operation scheme as a function of applied magnetic flux in both straddling and non-straddling modes.
Figure 3:
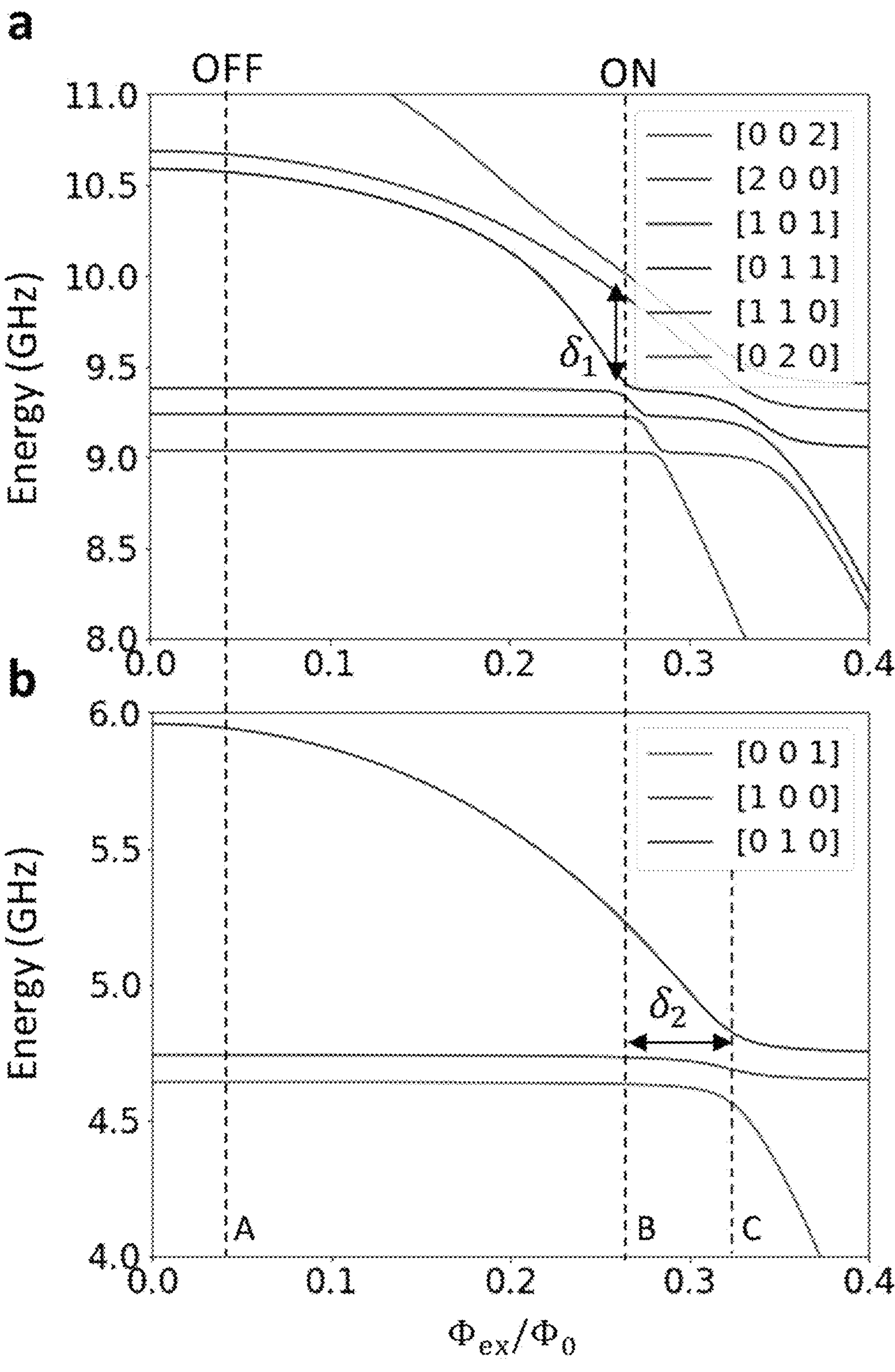
FIG. 3 shows an energy level diagram of the fluxonium coupler as a function of applied magnetic flux.

In FIGS. 2 and 3, state labels reflect the state of the system (and in particular the energy level of the system) according to the levels of excitation of the first transmon qubit, the fluxonium coupler, and the second transmon qubit respectively. Thus, the [002] label indicates that the first qubit and coupler are in the ground state, while the second qubit is in its second excited state. Likewise, the [110] label indicates that the first qubit and coupler are in their respective first excited states, and the second qubit is in its ground state. Other state labels have corresponding meanings.

The computational basis is formed from the states with the coupler in the ground state, i.e. the states [000], [001], [100], and [101]. As described below, the overall state of the system is controlled by inducing interactions between the qubits using the [020] state. More specifically, to perform the gate operation, the second excited state [020] of the fluxonium coupler is flux tuned to the state [101] in which each of the two transmon qubits is excited, as shown in FIG. 2. This tuning may be done in both the straddling and non-straddling regimes; see Koch, J. et al., "Charge insensitive qubit design derived from the Cooper pair box", Phys. Rev. A 76, 042319 (2007). Through flux tuning as described, a fast adiabatic two qubit CZ gate between the fixed-frequency transmons may be implemented without the need for a complicated compensation pulse as known in the prior art.

In FIG. 3 is shown energy levels of the system of FIG. 1 as a function of magnetic flux applied to the fluxonium coupler (e.g. coupler 16) with the aforementioned tuning. Each curve corresponds to the energy levels of a corresponding system state. The nine energy levels shown in FIG. 3 are divided over two panels "a" and "b", with panel "a" showing energy levels for two collective excitations (between the qubits and coupler) and panel "b" showing energy levels for a single excitation. As may be expected, the energy of the system with two excitations is roughly twice the energy of the system with only a single excitation. It is appreciated that other qubit/coupler configurations may be used, especially circuits tuned to different transition frequencies and energies, so the values and curves shown in FIG. 3 should not be viewed as limiting.

As an increasing external magnetic flux $\Phi_{ex}$ is applied to the coupler, the system energy decreases. This is reflected in FIG. 3 by a downward slope on each curve representing an excited coupler. Thus, the curves representing the states [010], [011], [110], and [020] have downward slopes as $\Phi_{ex}$ increases while the other curves (which represent the coupler in the ground state) remain relatively flat until higher-order interactions begin to be noticeable. As noted above, the slopes of these curves may be tuned in accordance with TFT embodiments that use a fluxonium coupler, an advantage that was not present in prior art TTT systems that use a transmon coupler.

It is possible to tune the fluxonium coupler to provide complete cancellation of ZZ interactions, as well as qubit-qubit effective interaction, due to level repulsion from the first excited state of the coupler (i.e. the [XY] interaction). Doing so implements a quantum logic gate, specifically an adiabatic controlled Z ("CZ") gate. These tunings are illustrated in FIG. 3, and now described.

The logic gate has three operating points, labeled by the dashed vertical lines "A", "B", and "C". The vertical line "A" extends through both panels, and corresponds to the "OFF" state of the gate. When the magnetic source has zero flux, the ZZ interaction is small but positive such that the OFF operation is always possible. This state is achieved by applying a suitable (typically small) offset bias to the coupler. In FIG. 3, this offset bias is approximately 0.04 times the magnetic flux quantum $\Phi_0$, although this bias value (close to zero magnetic flux quantum $\Phi_0$) is merely illustrative and not limiting. The "OFF" operating point may be chosen so that the two qubits have a ZZ interaction of zero, as close to zero as is measurable, or as close to zero as may be required for a particular gate design.

The ZZ interaction decreases as applied field increases, so there exists a flux at which ZZ is large. Thus, the vertical line "B", which also extends through both panels, corresponds to the "ON" state of the gate, at which the two qubits have a large, negative ZZ interaction. The system is held at this flux during computational state evolution. Simulation results show a considerable ZZ interaction of between 10 MHz to 50 MHz at the "ON" flux, which may be used to perform a fast two qubit CZ gate. The state [020] does not have a coupling term in the Hamiltonian, however, it is still possible to induce a large ZZ interaction through an assisted level. By having a coupler-assisted level (denoted by [011] in FIG. 3), there is an effective level repulsion Si between the two levels [101]-[020] near the crossing point, and line "B" indicates an avoided level crossing. This level repulsion can be used to perform a two-qubit gate, i.e. by sweeping the applied magnetic flux from the "A" line to the "B" line.

The vertical line "C", which is shown only in the bottom "b" panel, corresponds to a leakage point of the system, at which gate fidelity is impacted. In particular, beyond the vertical line "C", the energy of the computational state [001] begins to hybridize with the computational state [100] and coupler state [010], which leads to leakage to the coupler first excited state. Advantageously, there is a sizable flux buffer $\delta_2$ between the "ON" state "B" and the leakage state "C", which is not present in prior art systems that use a transmon coupler. For example, points "B" and "C" may be separated by 0.05 magnetic flux.

In FIG. 4 is shown a mask design 40 that implements the system of FIG. 1, with equivalent circuits identified and with enlarged views of certain portions of the design. It is appreciated that other mask designs may be used to implement the system of FIG. 1, and therefore that the particular design shown in FIG. 4 should not be viewed as limiting.

The mask design 40 includes a first qubit 42 which implements the first qubit 12 of FIG. 1. The equivalent circuit for the first qubit 42 is shown as 42'. The mask design 40 also includes a second qubit 44 which implements the second qubit 14 of FIG. 1. The equivalent circuit for the second qubit 44 is shown as 44'. The first qubit 42 and second qubit 44 each operate as parallel plate capacitors having a Josephson junction between them. The design of the Josephson junction for the second qubit 44 is shown in an enlarged view 45. The Josephson junction for the first qubit 42 may be prepared similarly.

The mask design 40 includes a fluxonium coupler 46 which implements the fluxonium coupler 16 of FIG. 1. The equivalent circuit for the fluxonium coupler 46 is shown as 46'. This circuit 46' includes a capacitor having a capacitance $C_c$, a Josephson junction having a junction energy of $E_{J_c}$, and an inductor having an energy $E_L$. The design of these components of the fluxonium coupler 46 are shown in an enlarged view 47.

Figure 5:
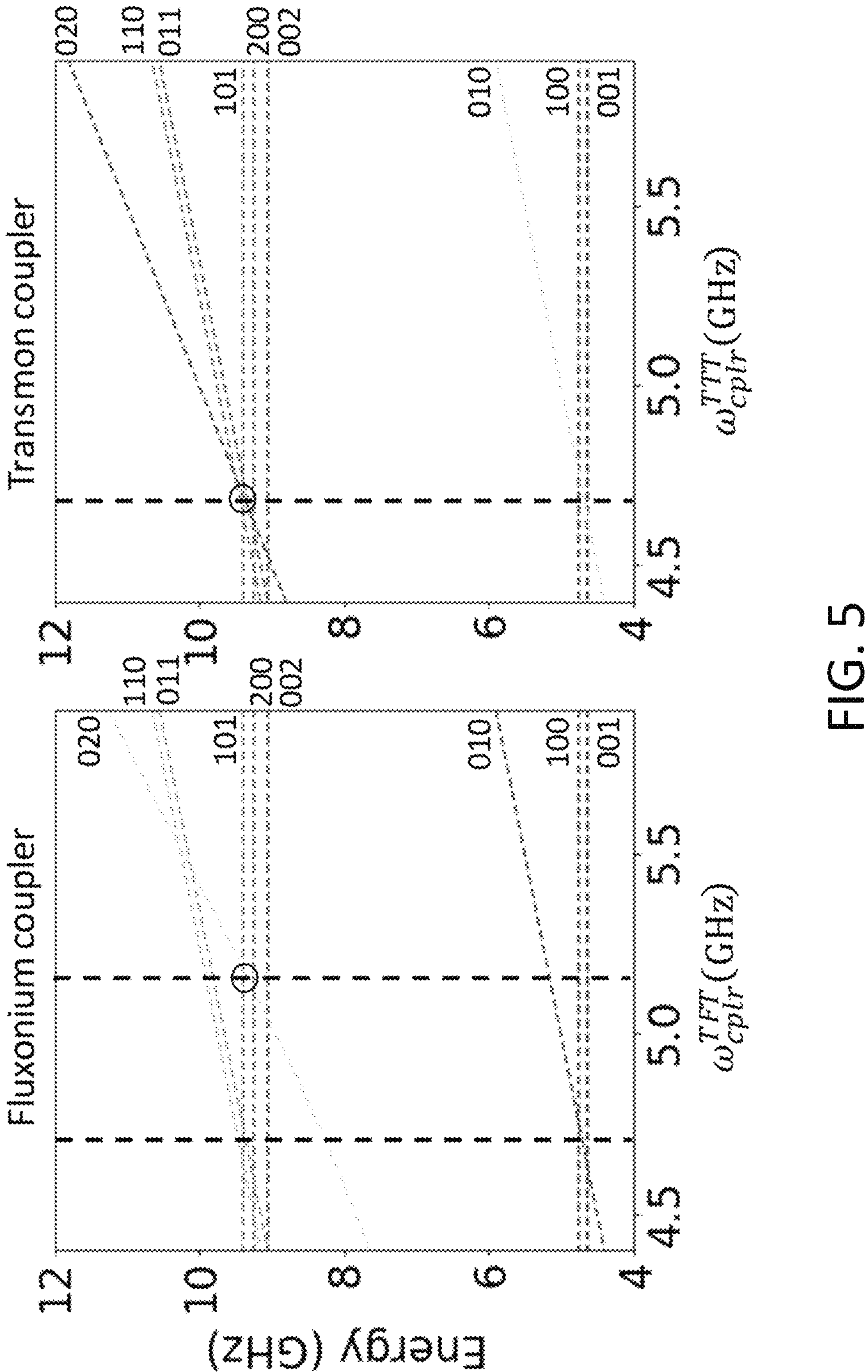
FIG. 5 shows energy levels of a transmon-fluxonium-transmon (TFT) system according to embodiments, as a function of transition frequency of the coupler, next to those of a prior art transmon-transmon-transmon (TTT) system.

FIG. 5 compares energy levels of a transmon-fluxonium-transmon (or "TFT" system) in the left panel, with a transmon-transmon-transmon (or "TTT" system) in the right panel, both as a function of frequency of the coupler. This coupler frequency is tuned using external magnetic flux, as shown in FIG. 3.

In accordance with embodiments of the TFT system, at a coupler frequency of about 5.2 GHz (the CZ gate operation), as shown in the left panel by the rightmost dashed vertical line, the second excited coupler state [020] has approximately the same energy as the computational state [101], as indicated by the small circle. This is very far from the single excitation energies [100] and [001] of the two qubits, i.e. the imaginary swap (iSWAP) gate operation, around 4.7 GHz as shown by the leftmost dashed vertical line. The CZ gate and iSWAP gate operation points can vary between 700 MHz and 200 MHz in the TFT system, but these fluxonium coupler operating frequencies may be separated by at least 100 MHz.

By contrast, in the prior art TTT system the second excited coupler state [020] has approximately the same energy as the computational state [101] at a coupler frequency of about 4.7 GHz, as shown in the right panel by the small circle on the dashed vertical line. Undesirably, this is the same frequency at which the first excited state [010] shares an energy with the first excitation energies of the two qubits, which causes leakage at the ON operation point. In the TTT system, both CZ gate and iSWAP gate occur at the same time when the gate is operated and this requires a compensation pulse, as noted in the prior art. This is not the case in the TFT system, where the CZ gate operation has a different frequency than the iSWAP gate operation.

Figure 6:
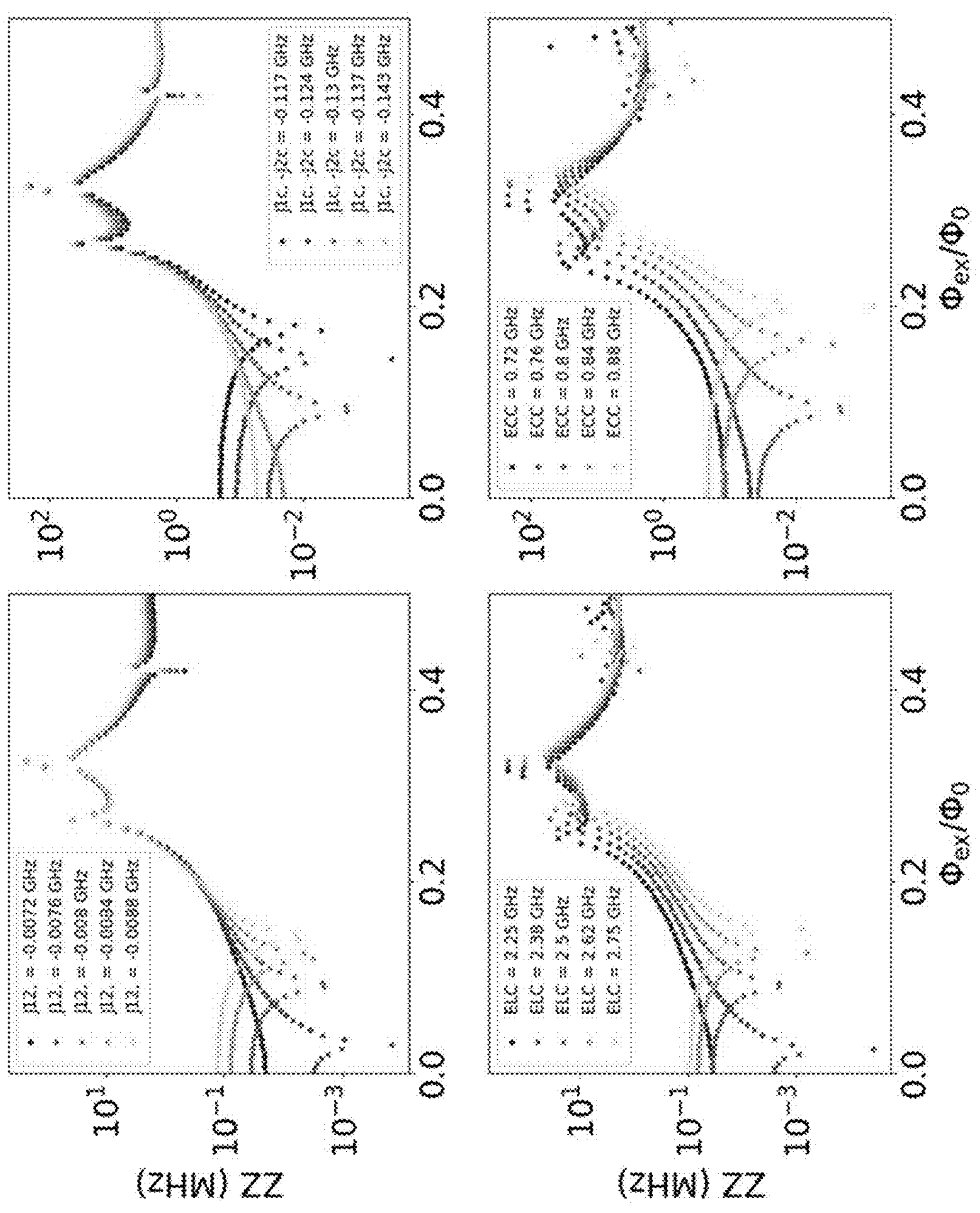
FIG. 6 shows the strength of the ZZ interaction between the two qubits as a function of applied magnetic flux according to various values of system design parameters.

In FIG. 6 is shown the strength of the ZZ interaction between the two qubits, as a function of applied magnetic flux according to various values of system design parameters shown in FIG. 4. These graphs show the variations of the parameters as a function of the circuit parameters. For each variation, we get different maximum negative ZZ, and different points of "OFF operation". Thus, the upper left panel shows the effect of varying the gap $J_{12}$ between the Josephson energies of the first and second qubits. The upper right panel shows the effect of varying the gap $J_{1c}$ (respectively $-J_{2c}$) between the first (respectively second) qubit and the coupler. The lower panel shown the strength of the ZZ interaction as a function of the capacitance of the fluxonium coupler (lower right panel) and inductance of the fluxonium coupler (lower left panel).

Figure 7:
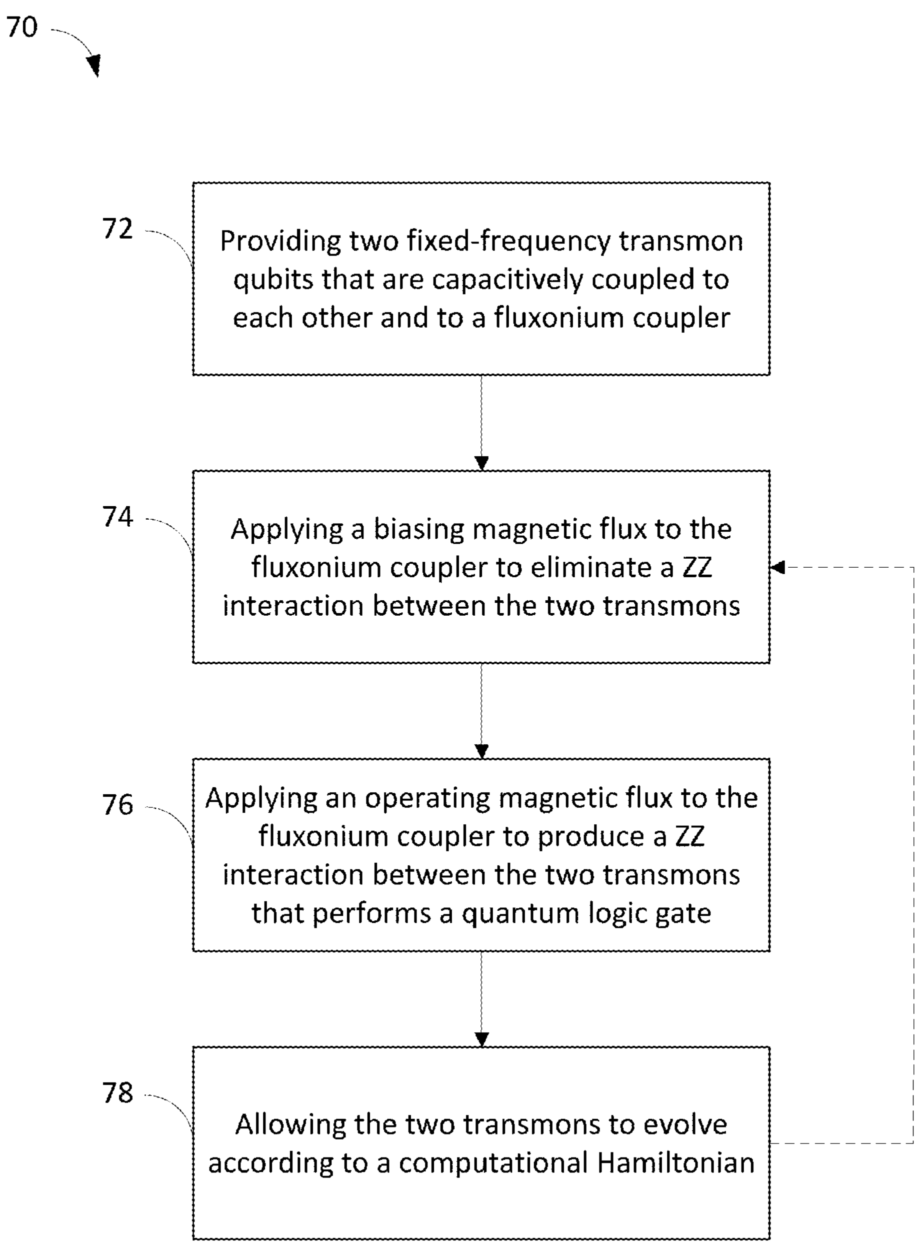
FIG. 7 shows a flowchart for a method of performing a quantum logic gate according to an embodiment.

In FIG. 7 is shown a flowchart for a method 70 of performing a quantum logic gate according to an embodiment. The quantum logic gate may be, among other things, an adiabatic controlled Z (CZ) gate or an adiabatic imaginary swap (iSWAP) gate. The method 70 begins with a process 72 providing (a) a first, fixed-frequency transmon qubit, (b) a second, fixed-frequency transmon qubit that is capacitively coupled to the first qubit, and (c) a fluxonium coupler that is capacitively coupled to the first qubit and to the second qubit. Or, more briefly, the process 72 includes providing a TFT system, i.e., two fixed-frequency transmon qubits that are capacitively coupled to each other and to a fluxonium coupler. TFT systems are shown in FIGS. 1 and 4 and described above. Relevantly, the ZZ interaction between the two transmon qubits may be positive before applying the magnetic flux to the fluxonium coupler.

The method 70 continues with a process 74 applying a biasing magnetic flux to the fluxonium coupler to eliminate a ZZ interaction between the two transmons. The biasing magnetic flux may be implemented using a magnetic source known in the art for generating magnetic fields, and the magnitude of the biasing magnetic flux for any given TFT system may be determined from known computations using the various capacitances, junction energies, and inductances present in the system, or from empirical observation of the ZZ interaction between the transmons. Applying the biasing magnetic flux to the fluxonium coupler may decrease the ZZ interaction between the transmons; i.e., reduce it from a small positive magnitude to zero (or as close to zero as may be required or desired to avoid ZZ interactions between computational phases). The process 74 places the TFT system into a non-computational or "OFF' state.

The method 70 proceeds with a process 76 applying an operating magnetic flux to the fluxonium coupler, thereby altering the ZZ interaction between the two transmons to perform the quantum logic gate. The ZZ interaction may be altered to a given negative magnitude, e.g., at least 10 MHz (or at least 30 MHz, or at least 50 MHz), to ensure gate fidelity.

Having performed the desired quantum logic gate, the process 76 places the TFT system into a computational or "ON" state. Therefore, the method 70 continues with a process 78 allowing the two transmons to evolve according to a computational Hamiltonian. That is, the process 78 performs a quantum computation (or one phase of a multi-phase computation).

Once the computation is concluded, the method 70 returns the TFT system to its "OFF" state by returning to process 74. If no further computation is desired, the method 70 may terminate. Otherwise, the method 70 continues again to the process 76. Notably, the process 76 may apply different operating magnetic fluxes to the fluxonium coupler each time it is entered. Each such magnetic flux may correspond to a different quantum logic gate. Thus, the same TFT system may be used as an adiabatic controlled Z (CZ) gate during one phase of a computation, and as an adiabatic imaginary swap (iSWAP) gate during a subsequent phase. In this way, a fixed hardware configuration of TFT systems may be programmed to execute many different quantum circuits.

Although reference is made herein to particular materials, it is appreciated that other materials having similar functional and/or structural properties may be substituted where appropriate, and that a person having ordinary skill in the art would understand how to select such materials and incorporate them into embodiments of the concepts, techniques, and structures set forth herein without deviating from the scope of those teachings.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal, "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A system comprising:

a first, fixed-frequency transmon qubit;

a second, fixed-frequency transmon qubit having a direct capacitive coupling to the first qubit;

a fluxonium coupler that is capacitively coupled to the first qubit and to the second qubit in parallel with the direct capacitive coupling; and a magnetic source for applying a magnetic flux to the fluxonium coupler.

2. The system according to claim 1, wherein the first transmon qubit and the second transmon qubit each comprise a capacitor and a Josephson junction.

3. The system according to claim 1, wherein the fluxonium coupler comprises a capacitor, a Josephson junction, and an inductor.

4. The system according to claim 1, wherein the first transmon qubit and the second transmon qubit have a ZZ interaction that is positive when the magnetic source has zero flux.

5. The system according to claim 4, wherein the magnetic source is configured to apply a biasing magnetic flux that eliminates the ZZ interaction between the first transmon qubit and the second transmon qubit.

6. The system according to claim 5, wherein the magnetic source is further configured to apply an operating magnetic flux that is greater than the biasing magnetic flux and that produces a given negative ZZ interaction between the first transmon qubit and the second transmon qubit.

7. The system according to claim 6, wherein the given negative ZZ interaction has a magnitude of at least 10 MHz.

8. The system according to claim 6, wherein the magnetic source is further configured to sweep the magnetic flux between the biasing magnetic flux and the operating magnetic flux to thereby implement an adiabatic controlled Z (CZ) quantum logic gate.

9. The system according to claim 8, wherein the magnetic source is further configured to apply a second operating magnetic flux to the fluxonium coupler to thereby implement an adiabatic imaginary swap (iSWAP) quantum logic gate.

10. The system according to claim 9, wherein the operating magnetic flux and the second operating magnetic flux correspond to fluxonium coupler operating frequencies that are separated by at least 100 MHz.

11. A method of performing a quantum logic gate, the method comprising:

providing (a) a first, fixed-frequency transmon qubit, (b) a second, fixed-frequency transmon qubit having a direct capacitive coupling to the first qubit, and (c) a fluxonium coupler that is capacitively coupled to the first qubit and to the second qubit in parallel with the direct capacitive coupling; and applying a magnetic flux to the fluxonium coupler, thereby altering a ZZ interaction between the first transmon qubit and the second transmon qubit to perform the quantum logic gate.

12. The method according to claim 11, wherein the quantum logic gate comprises an adiabatic controlled Z (CZ) gate.

13. The method according to claim 11, wherein providing comprises providing the first and second transmon qubits having a ZZ interaction that is positive before applying the magnetic flux to the fluxonium coupler.

14. The method according to claim 11, wherein applying the magnetic flux to the fluxonium coupler comprises decreasing the ZZ interaction between the first transmon qubit and the second transmon qubit.

15. The method according to claim 14, wherein applying the magnetic flux to the fluxonium coupler comprises applying a biasing magnetic flux that eliminates the ZZ interaction between the first transmon qubit and the second transmon qubit.

16. The method according to claim 15, further comprising applying an operating magnetic flux that is greater than the biasing magnetic flux and that produces a given negative ZZ interaction between the first transmon qubit and the second transmon qubit.

17. The method according to claim 16, wherein the given negative ZZ interaction has a magnitude of at least 10 MHz.

18. The method according to claim 16, wherein applying the magnetic flux to the fluxonium coupler comprises sweeping the magnetic flux between the biasing magnetic flux and the operating magnetic flux to thereby implement the quantum logic gate.

19. The method according to claim 16, further comprising applying a second operating magnetic flux to the fluxonium coupler to thereby implement an adiabatic imaginary swap (iSWAP) quantum logic gate.

20. The method according to claim 19, wherein the operating magnetic flux and the second operating magnetic flux correspond to fluxonium coupler operating frequencies that are separated by at least 100 MHz.

* * * * *